(12) United States Patent
Leonard et al.

(10) Patent No.: US 10,818,458 B2
(45) Date of Patent: Oct. 27, 2020

(54) RECREATIONAL VEHICLE POWER CONTROL MODULES AND SYSTEMS

(71) Applicant: Command Electronics, LLC, Hickory, NC (US)

(72) Inventors: Charles A Leonard, Hickory, NC (US); Mark D Ehrnsberger, Horse Shoe, NC (US)

(73) Assignee: Command Electronics, LLC, Hickory, NC (US)

( * ) Notice: Subject to any disclaimer, the term of this patent is extended or adjusted under 35 U.S.C. 154(b) by 0 days.

(21) Appl. No.: 16/352,395

(22) Filed: Mar. 13, 2019

(65) Prior Publication Data

US 2020/0294745 A1 Sep. 17, 2020

(51) Int. Cl.
*H02P 7/03* (2016.01)
*H01H 47/22* (2006.01)
*B60R 16/03* (2006.01)

(52) U.S. Cl.
CPC ............. *H01H 47/22* (2013.01); *B60R 16/03* (2013.01); *H02P 7/04* (2016.02)

(58) Field of Classification Search
CPC ............ H02P 7/04; H01H 47/22; B60R 16/03
See application file for complete search history.

(56) References Cited

U.S. PATENT DOCUMENTS

| | | | |
|---|---|---|---|
| 2002/0070700 A1* | 6/2002 | McManus | B60P 3/34 318/700 |
| 2010/0176359 A1* | 7/2010 | Wisner | B60S 9/08 254/425 |
| 2014/0265941 A1* | 9/2014 | Robinson | G08C 17/02 318/16 |

* cited by examiner

*Primary Examiner* — Cortez M Cook
(74) *Attorney, Agent, or Firm* — Clements Bernard Walker

(57) ABSTRACT

Disclosed herein are control modules and methods for controlling recreational vehicle power in auxiliary systems. The control modules may be installed and/or retrofitted to connect with power systems in recreational vehicles and thereby control operation of auxiliary components, such as slide-outs and awnings, for example. The disclosed control modules and systems may be remotely and/or automatically operated and programmed via wireless devices and/or software applications.

11 Claims, 17 Drawing Sheets

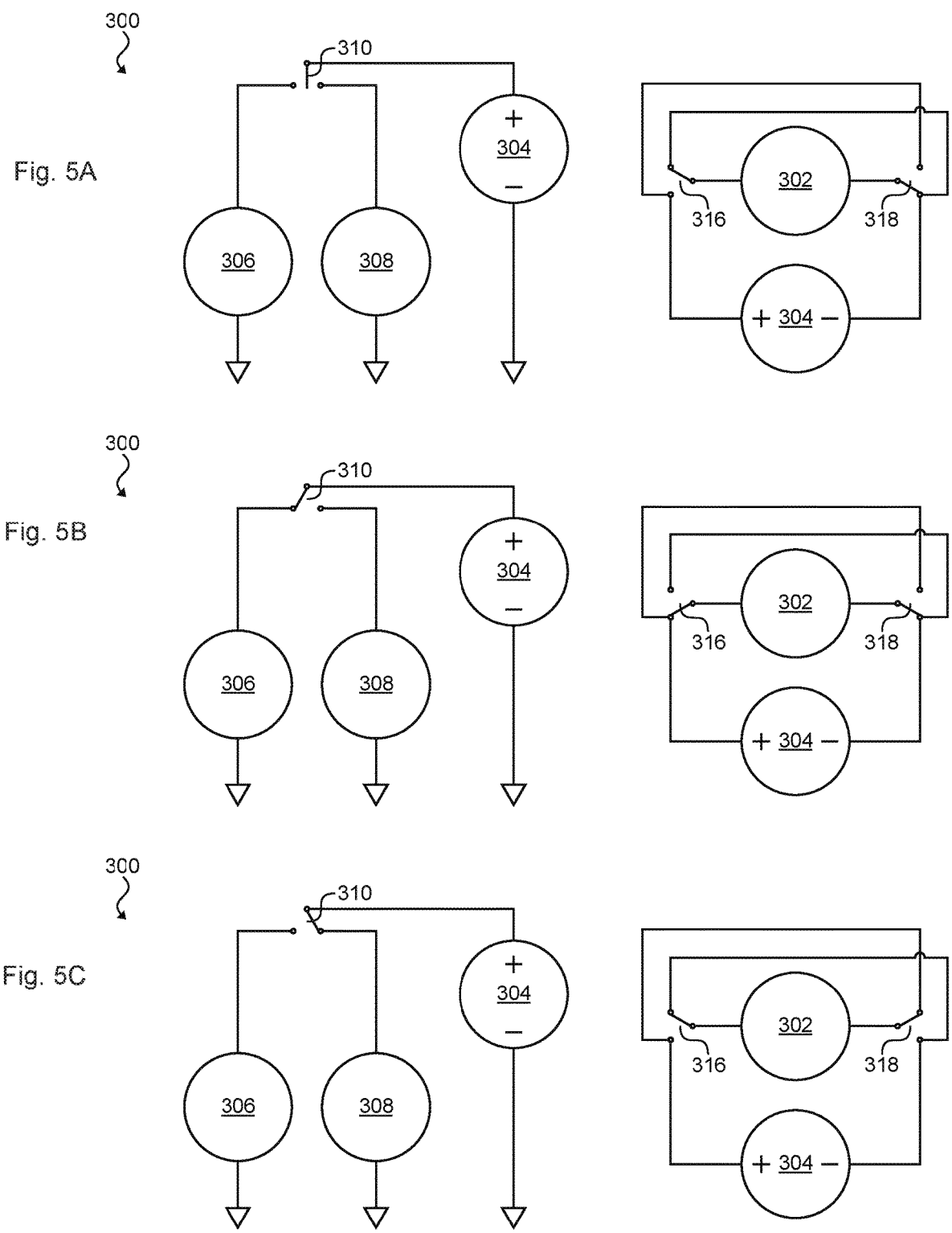

US 10,818,458 B2

RECREATIONAL VEHICLE POWER CONTROL MODULES AND SYSTEMS

FIELD OF THE DISCLOSURE

The present disclosure relates generally to power systems in recreational vehicles. More specifically, the present disclosure relates to control modules and methods for controlling the operation of recreational vehicle power in auxiliary systems.

BACKGROUND OF THE DISCLOSURE

Recreational vehicles may include auxiliary systems, such as slide-outs, awnings, or stabilizer jacks, for example, that are selectively powered to activate associated motors to extend and/or retract the structure. To control these auxiliary systems, conventional recreational vehicles have manual switches, such as 12 V DC rocker switches, installed. While inexpensive, these manual switches have many shortcomings, however, related to both safety and convenience.

First, these manual switches for controlling auxiliary systems are typically mounted inside the recreational vehicle in the living quarters. Yet, the auxiliary systems controlled by the manual switches are typically located—or at least operated with more visibility from a vantage point—exterior to the recreational vehicle. The inconvenient positioning of the manual switches presents a potential safety issue where operation of an auxiliary system, such as a slide-out room, section, or awning, is controlled from the interior of the recreational vehicle, while the auxiliary system is moving parts of the exterior of the recreational vehicle.

In addition, when attempting to position a recreational vehicle in a campsite or other venue with obstructions such as trees or power poles, adequate space must be provided for any auxiliary systems to be extended at the site. It would be advantageous during these times to extend one or more of the auxiliary systems, such as slide-out rooms or sections, to ensure proper positioning. Otherwise, without extending the auxiliary systems, the recreational vehicle may end up positioned too close to an obstruction, which would inhibit the full extension of the slide-out and cause the user to have to reposition the recreational vehicle. Traditionally, slide-outs may be extended using the manual rocker switches inside the recreational vehicle, but the user must first maneuver the recreational vehicle into an initial position, exit the tow vehicle or cab, enter the living quarters of the recreational vehicle, then extend the desired slide-outs using the manual rocker switches, exit the recreational vehicle, and re-enter the tow vehicle or cab to continue positioning and re-positioning the recreational vehicle. This traditional method is so time consuming and inconvenient that most users will instead take extensive measurements between the recreational vehicle and any obstruction during the positioning process, which may also require multiple trips in and out of the tow vehicle or cab.

Currently, there are systems available on new higher end recreational vehicle's that allow for Bluetooth control of many recreational vehicle systems. These systems use a single Bluetooth connection which requires that the wiring for all controlled systems be routed to a central location in the recreational vehicle, where the central panel of the remote-control system will be located. While this is acceptable for new recreational vehicle's, retrofitting an existing recreational vehicle with this type of system is not possible because the centralized wiring required doesn't exist in recreational vehicle's that didn't have the centralized remote-control system installed when the recreational vehicle was manufactured. These centralized remote-control systems for recreational vehicle's are patented and the patent centers around a single Bluetooth or other wireless protocol connection.

Thus, what is still needed in the art is a solution and method for operating the auxiliary systems of a recreational vehicle remotely that is both inexpensive and safe and may be installed and/or retrofitted in any recreational vehicle.

BRIEF DESCRIPTION OF THE DRAWINGS

The disclosed control modules and systems are illustrated and described herein with reference to the drawings, in which:

FIGS. 5A-C are diagrams of an example embodiment of a circuit system within a control module and system including relays, in accordance with aspects of the present disclosure;

DETAILED DESCRIPTION OF THE DISCLOSURE

Figure 1:
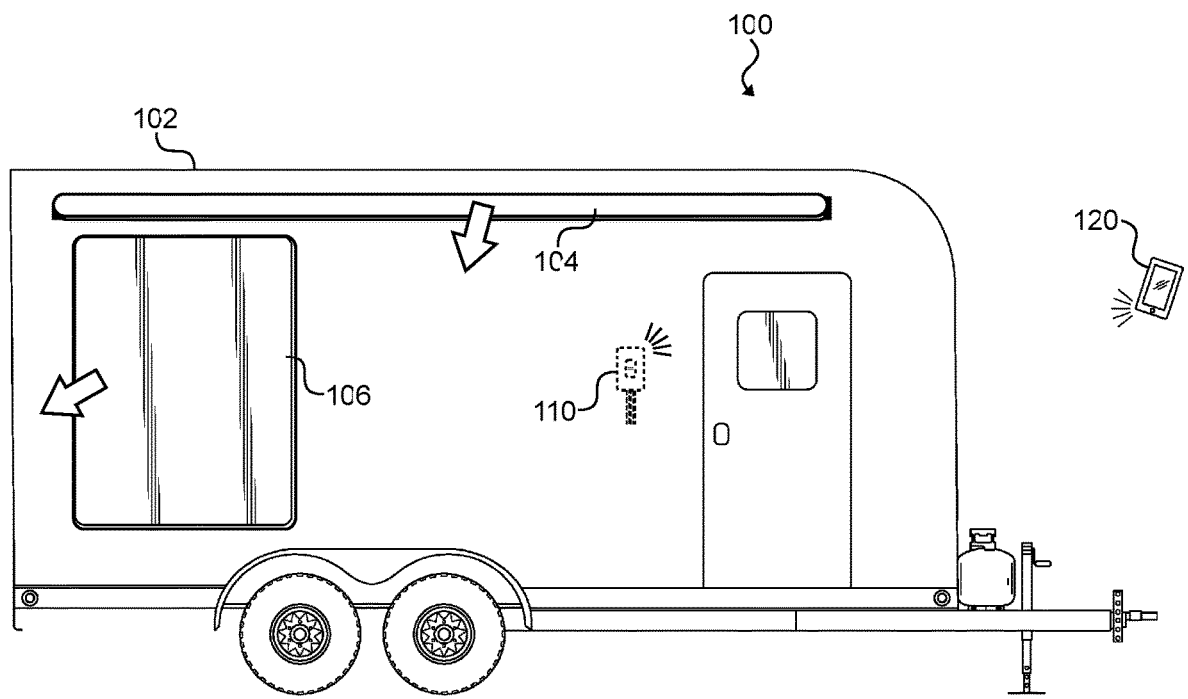
FIG. 1 is a side elevation view of an example embodiment of a control module and system as installed in a towable recreational vehicle, in accordance with aspects of the present disclosure.

The presently disclosed control modules and systems enable remote and/or automatic operation of auxiliary components in recreational vehicles, when installed and/or retrofitted into the recreational vehicle power systems. The presently disclosed methods may allow a user to wirelessly operate the auxiliary systems, such as a slide-outs, awnings, or stabilizer jacks, for example, via a software application and/or smart device. Additionally or alternatively, the presently disclosed methods may allow a user to automatically operate the auxiliary systems, such that the auxiliary systems fully retract and/or fully extend without the user having to manually actuate a switch for the duration of the extension/retraction. Further, the control modules and systems may include additional safety and convenience features.

The control modules may replace standard installations of 12 V DC manual rocker switches that control various auxiliary power systems, such as awnings, stabilizer jacks, and/or slide-out rooms in recreational vehicles, for example. The control modules may beneficially allow a user to remotely operate various exterior systems associated with a recreational vehicle from outside the recreational vehicle in a safer and more convenient vantage point. Additionally, users may be able to remotely operate the control modules (and therefore the switches) from a cab of the recreational vehicle or tow vehicle for a camper. Advantageously, the ability to remotely operate slide-out systems in a recreational vehicle may allow a user to test the positioning of the recreational vehicle near obstructions (e.g., trees, power poles) and to easily reposition the recreational vehicle without ever having to enter the recreational vehicle or even leave the cab or driver's seat.

The control modules may increase safety and convenience by overcoming some of the shortcomings of the manual rocker switch. Because the control module switches can be operated both manually and remotely with a wireless device, the user can choose to control auxiliary power systems from outside the recreational vehicle while watching them closely to ensure that they do not hit any nearby obstructions. The auxiliary power systems may also be controlled from the driver's seat of the tow vehicle or cab, thereby enabling the driver to extend one or more slide-outs without exiting the tow vehicle or cab. As mentioned above, this can be useful in the positioning of the recreational vehicle.

To lower costs and add to a user's convenience, some control modules may not include a wireless module, but instead include timing and memory electronic components within a printed circuit board of the mountable control module. Utilizing these components, the control module may be programmed by the user to track and/or time the extension and retraction of the recreational vehicle auxiliary systems under normal operating conditions. For example, a user may initiate an automatic extend timing program, in which the user holds a button or switch on the user interface of the control module from when the recreational vehicle auxiliary system is fully retracted to fully extended and vice versa. Because the control module electronics measures and stores the automatic extension/retraction times, the user may initiate a full automatic operating sequence of any of the recreational vehicle auxiliary systems. Additionally, this programming may be integrated with the wireless module and connectable device.

Further, in some embodiments of the present disclosure the control system may include instant stop or abort signals that will cause the control module to abandon the full automatic extension/retraction routine. In this case, the control modules and systems may also include timing circuits and/or sensors that measure the actual time that the recreational vehicle auxiliary system was retracted and/or extended before being interrupted. Using the measured actual extension/retraction times, if an automatic extension/retraction signal is received by the control module, the control module may generate a remaining extension/retraction time based on the stored automatic extension/retraction times and the measured actual extension/retraction times.

As shown in FIG. 1, a control system 100 may be installed in a recreational vehicle 102 to control auxiliary systems, such as a power awning 104 and power slide-out 106. Auxiliary power systems may include any system or mechanism connected to and/or controlled by the control system. For example, in the recreational vehicle industry, auxiliary power systems may include, but are not limited to, slide-outs, awnings, jacks, and stabilizers.

Prior to installation of the control system 100 in the recreational vehicle 102, the auxiliary power systems may be extended from a fully-retracted position to about midway to a fully-extended position. This preparation may allow for testing of the control system 100 operations of the auxiliary power systems following installation.

The control system 100 may include a control module 110 and a wireless device 120. The control module 110 may be housed in a custom mounting plate and mounted on the wall of the living quarters of the recreational vehicle 102. For example, the mounting plate may have a width of about 2.25 inches (about 5.7 cm) and a height of about 3 inches (about 7.6 cm).

The control module 110 may include a switch and a printed circuit board (PCB) positioned on the back of the mounting plate. The switch may be directly or indirectly connected to the printed circuit board. In some embodiments, the switch may be a 12 V DC electronic switch.

The control module 110 may directly and/or indirectly interface with the electrical connections of the auxiliary power systems within the recreational vehicle 102. By interfacing with the electrical connections of the auxiliary power systems, the control module 110 may selectively operate and control the rotational direction of any motors driving the auxiliary power systems. Because the auxiliary power systems may utilize relatively large amounts of electrical current, such as about 10 A, for example, all of the power sources should be disconnected from the recreational vehicle 102 prior to installation of the control module 110. Connections to power sources within the recreational vehicle 102 may include connections to external 120 V AC power and 12 V DC batteries, for example. The control module 110 may include adapters or other connectors for connecting to electrical connections of the auxiliary power systems. For example, the electrical connections of the auxiliary power systems may include wiring, and the control module 110 may include tap and run crimp connectors suitable for connection to wiring. The tap and run crimp connectors may advantageously allow for installation of the control module 110 into the electrical connections of the auxiliary power systems without having to cut or strip any wires.

In some embodiments, the control module 110 may include 4 wires connected to the printed circuit board—2 motor wires, 1 negative (ground) wire, and 1 positive power wire, for example.

After installation of the control module 110 and re-connection of the power sources, the control module 110 may be configured to emit an audio and/or visual indication to the user that the control module 110 is receiving power. Additionally or alternatively, the control module 110 may be configured with an audio and/or visual indicator for alerting the user to an error.

Figure 7:
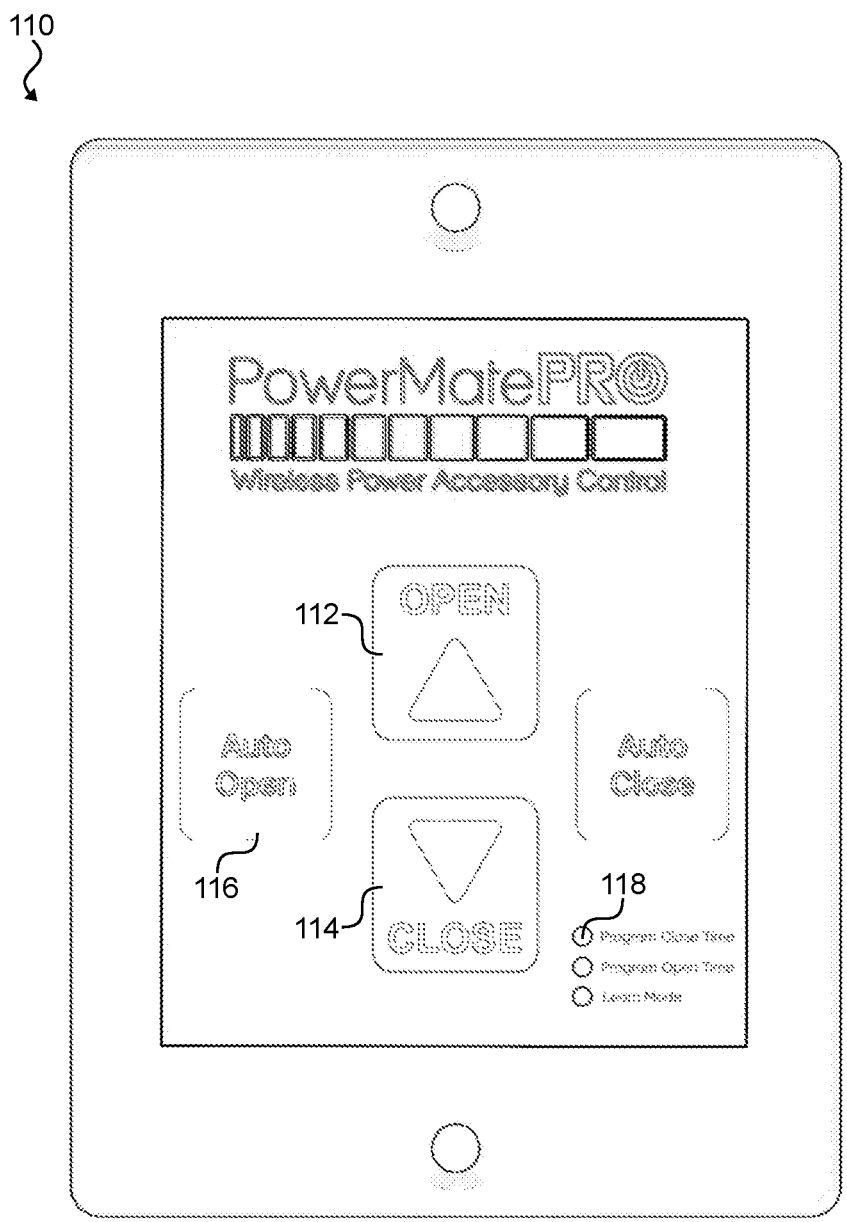
FIG. 7 is a diagram of an example embodiment of a mountable control module with a user interface panel for operating auxiliary systems of a recreational vehicle within a control system, in accordance with aspects of the present disclosure.
Figure 8:
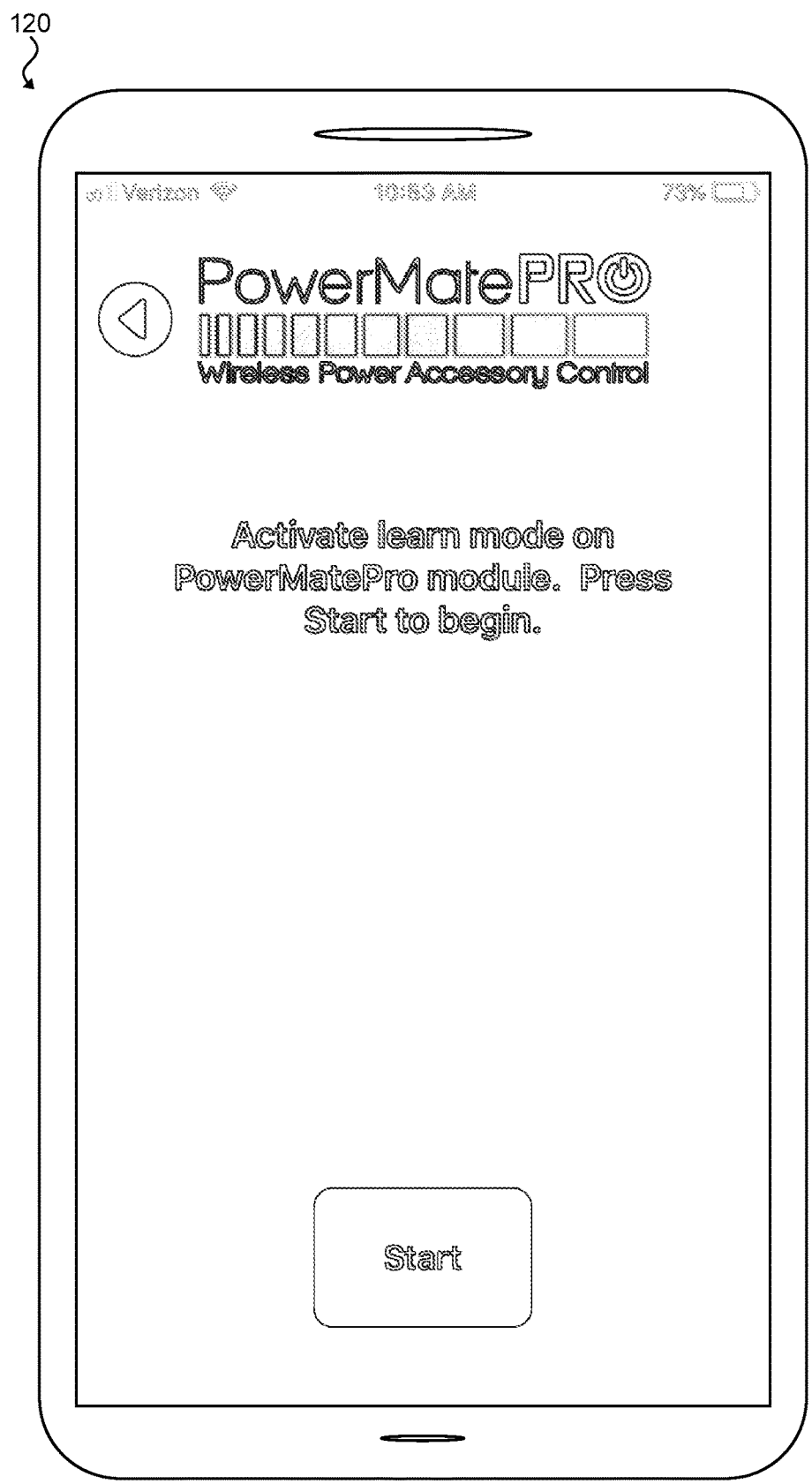
FIG. 8 is a screen view of an example embodiment of a user interface within a software application running on a wireless device included in a recreational vehicle auxiliary control system, in accordance with aspects of the present disclosure.
Figure 9:
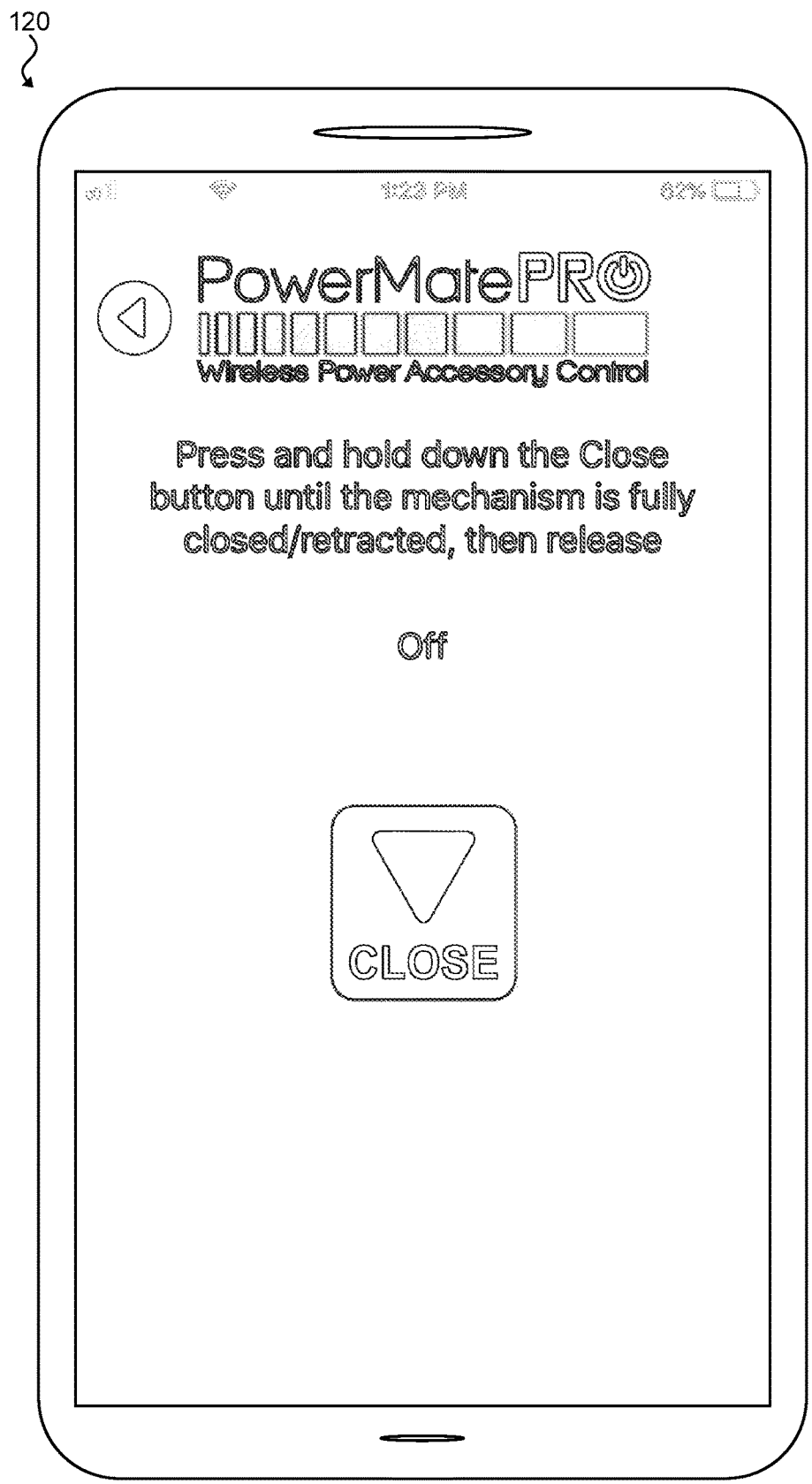
FIG. 9 is a screen view of an example embodiment of another user interface within the software application running on the wireless device included in the recreational vehicle auxiliary control system of FIG. 8, in accordance with aspects of the present disclosure.
Figure 10:
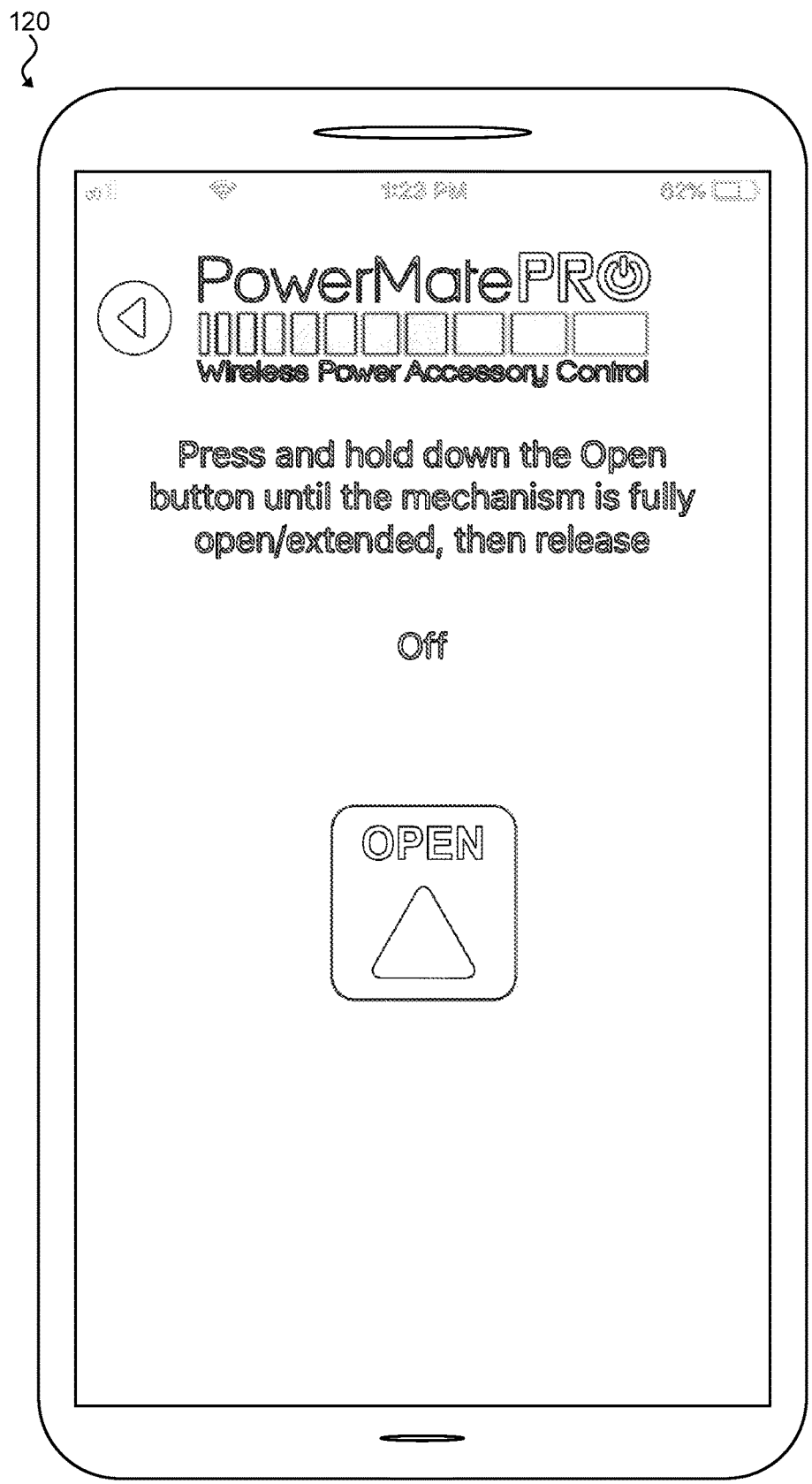
FIG. 10 is a screen view of an example embodiment of another user interface within the software application running on the wireless device included in the recreational vehicle auxiliary control system of FIGS. 8-9, in accordance with aspects of the present disclosure.
Figure 11:
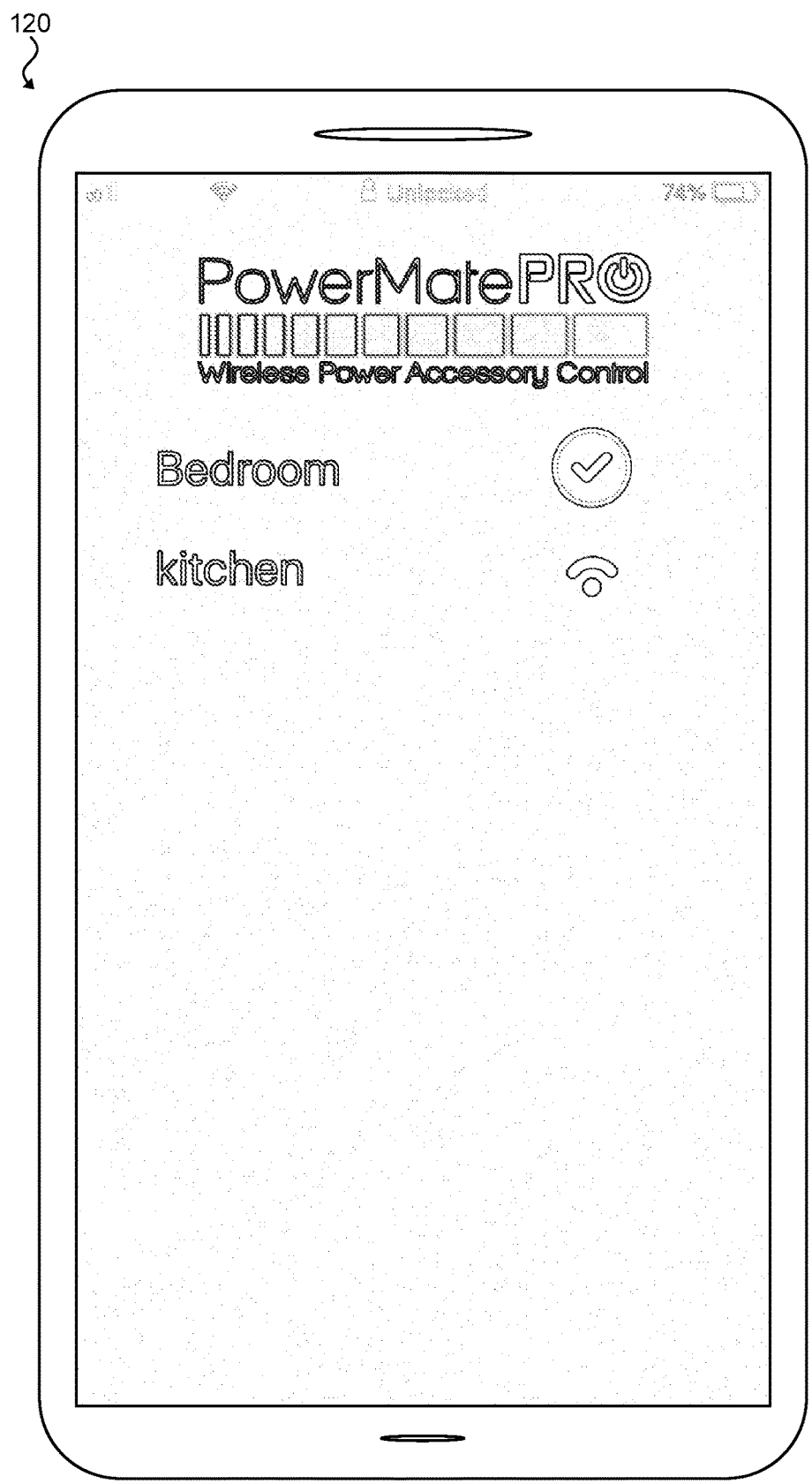
FIG. 11 is a screen view of an example embodiment of another user interface within the software application running on the wireless device included in the recreational vehicle auxiliary control system of FIGS. 8-10, in accordance with aspects of the present disclosure.
Figure 12:
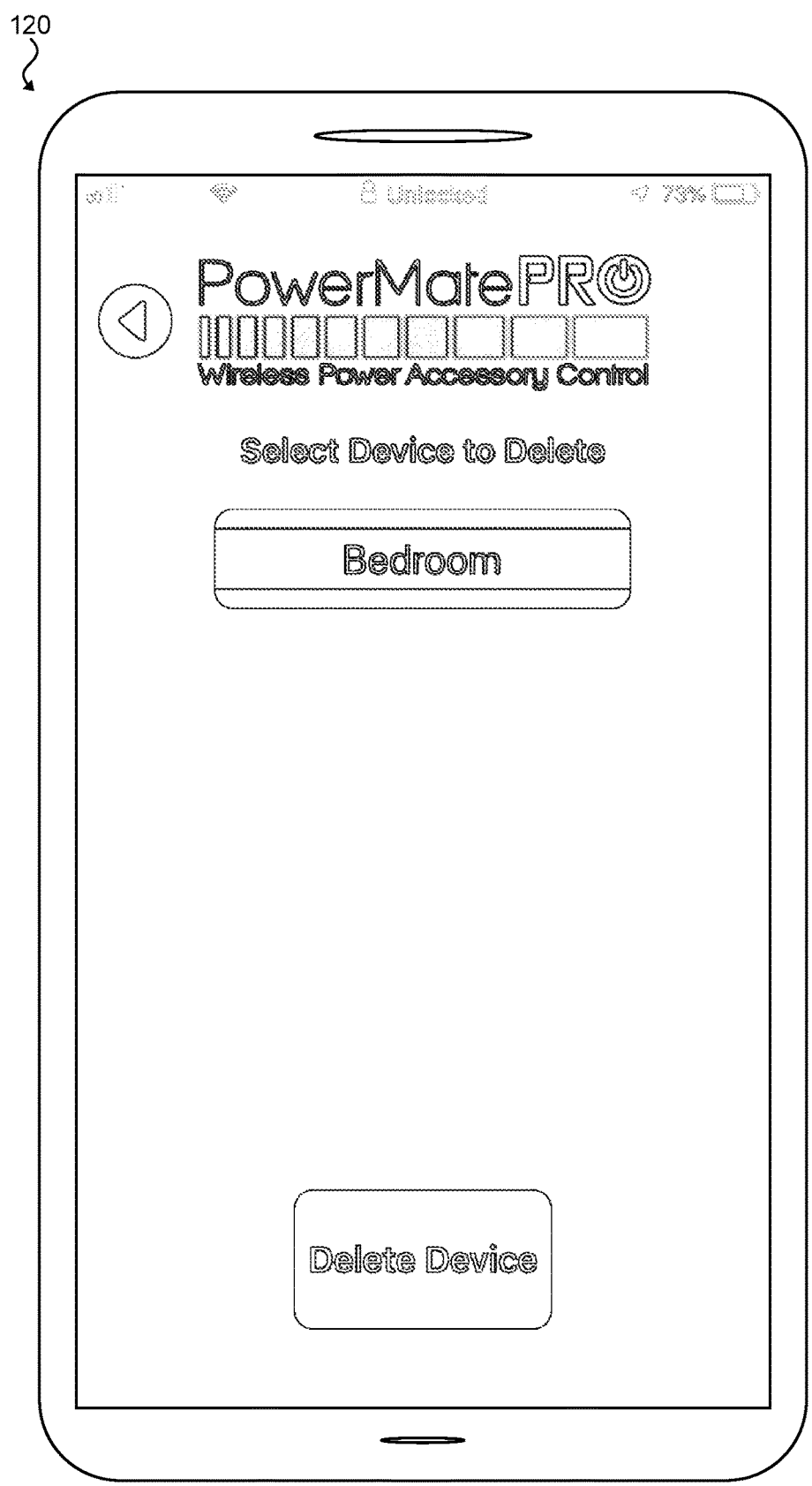
FIG. 12 is a screen view of an example embodiment of another user interface within the software application running on the wireless device included in the recreational vehicle auxiliary control system of FIGS. 8-11, in accordance with aspects of the present disclosure.
Figure 13:
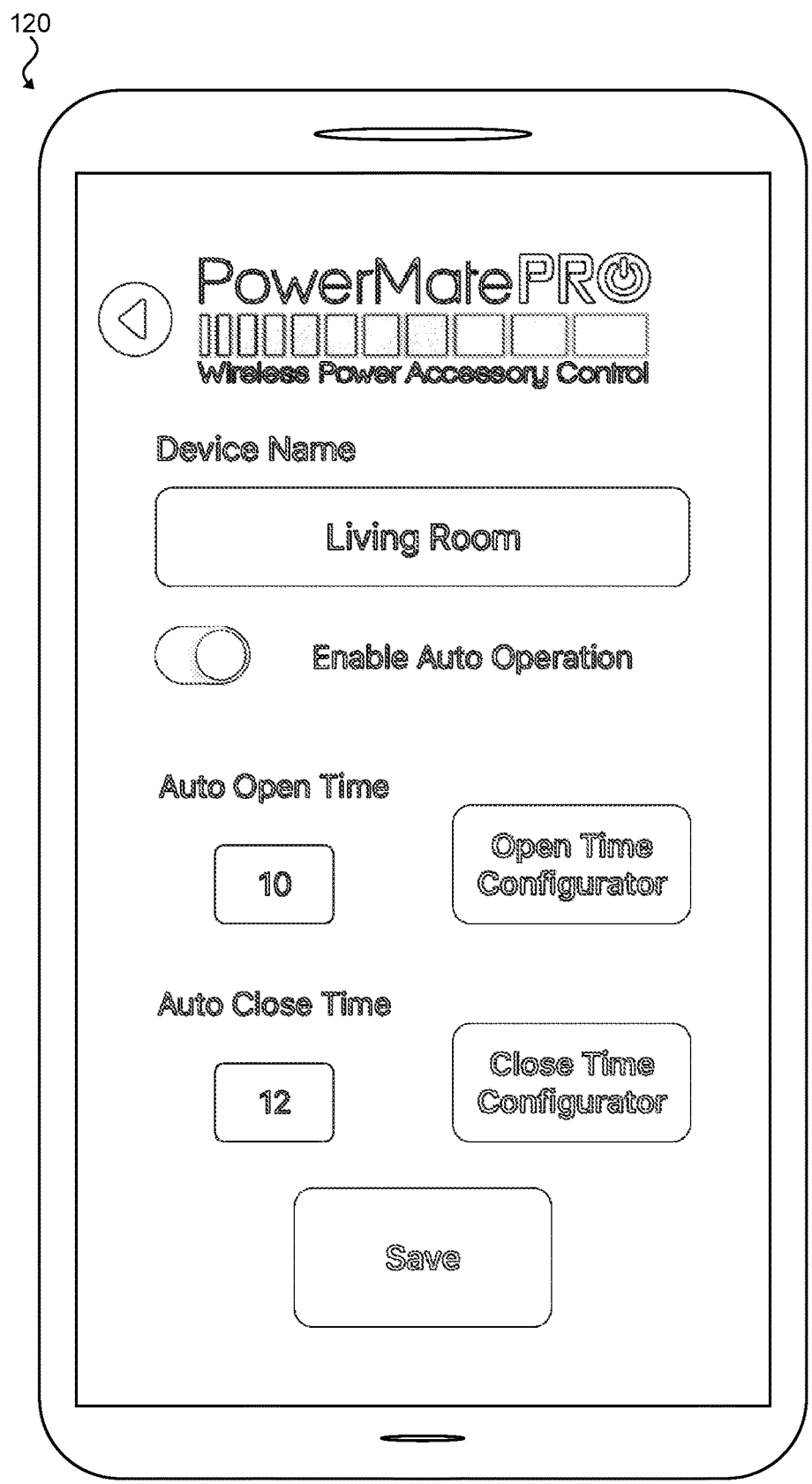
FIG. 13 is a screen view of an example embodiment of another user interface within the software application running on the wireless device included in the recreational vehicle auxiliary control system of FIGS. 8-12, in accordance with aspects of the present disclosure.
Figure 14:
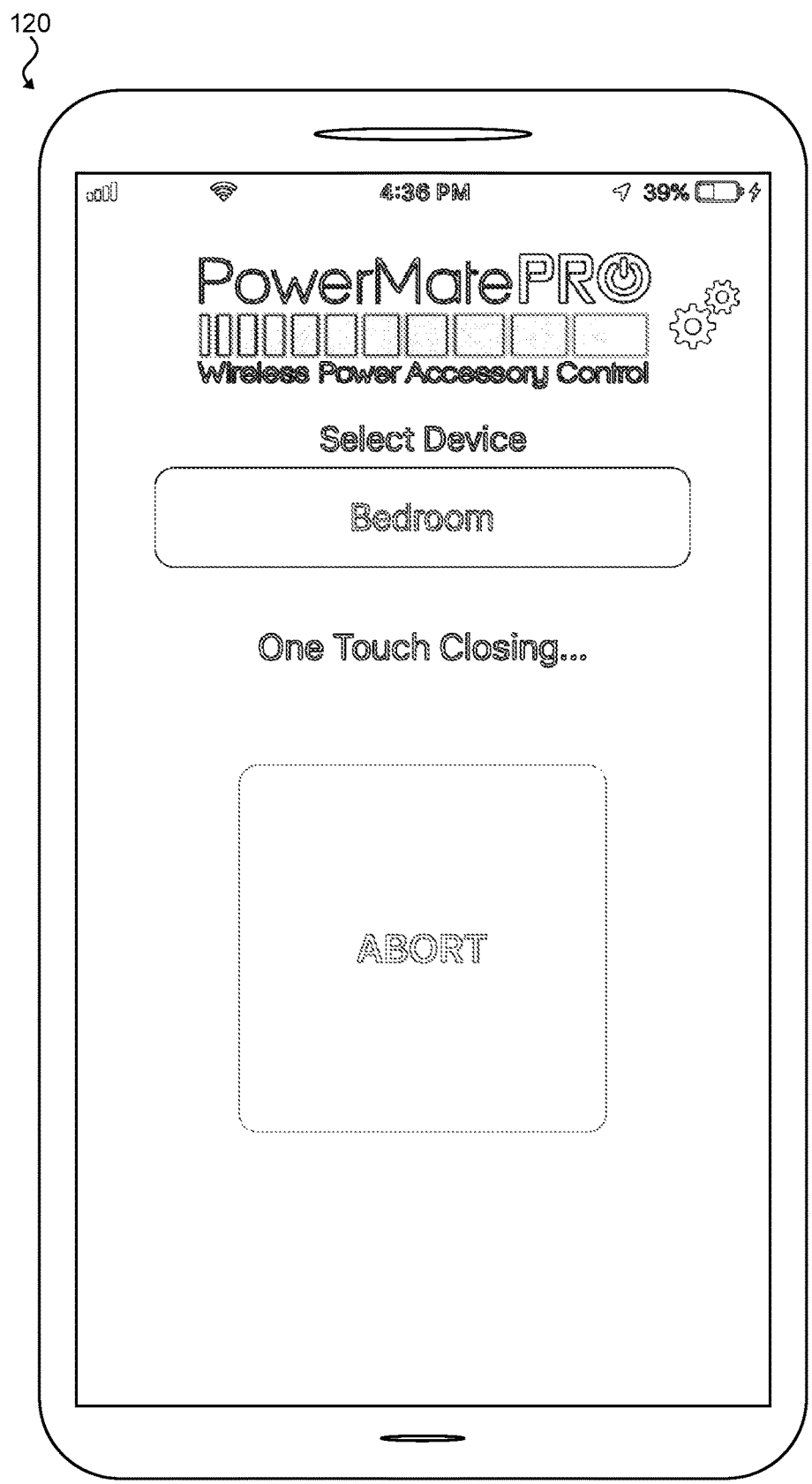
FIG. 14 is a screen view of an example embodiment of another user interface within the software application running on the wireless device included in the recreational vehicle auxiliary control system of FIGS. 8-13, in accordance with aspects of the present disclosure.
Figure 15:
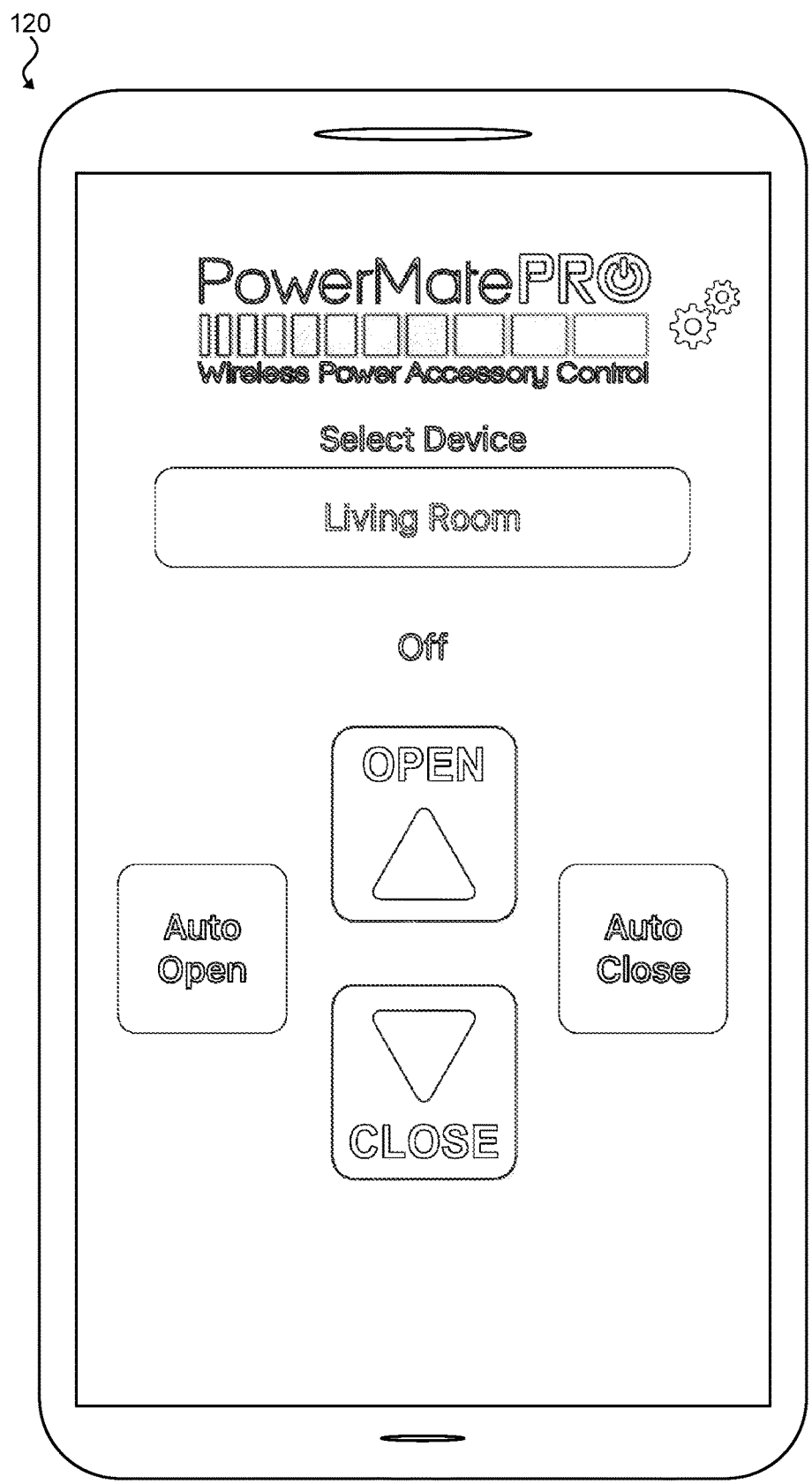
FIG. 15 is a screen view of an example embodiment of another user interface within the software application running on the wireless device included in the recreational vehicle auxiliary control system of FIGS. 8-14, in accordance with aspects of the present disclosure.
Figure 16:
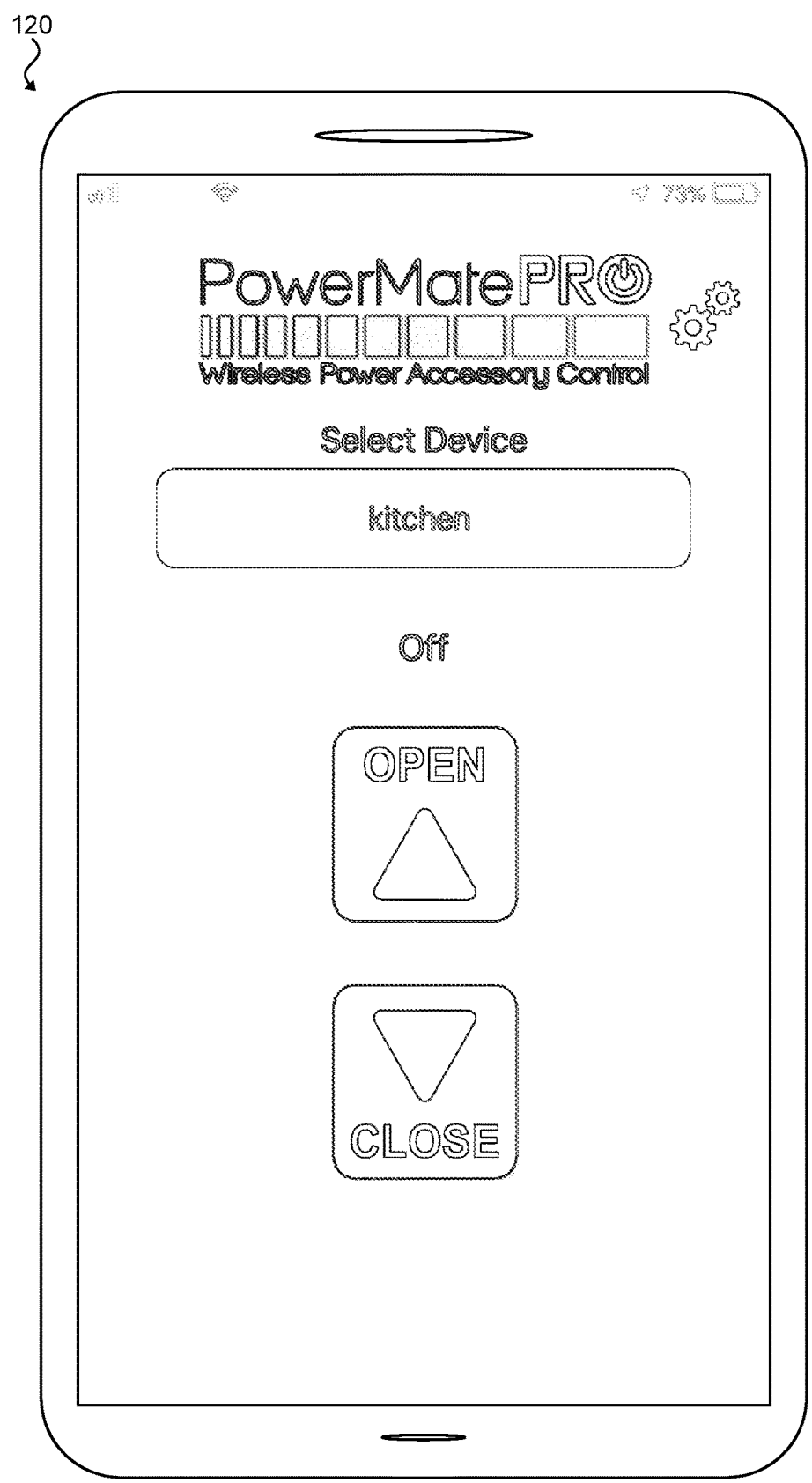
FIG. 16 is a screen view of an example embodiment of another user interface within the software application running on the wireless device included in the recreational vehicle auxiliary control system of FIGS. 8-15, in accordance with aspects of the present disclosure.
Figure 17:
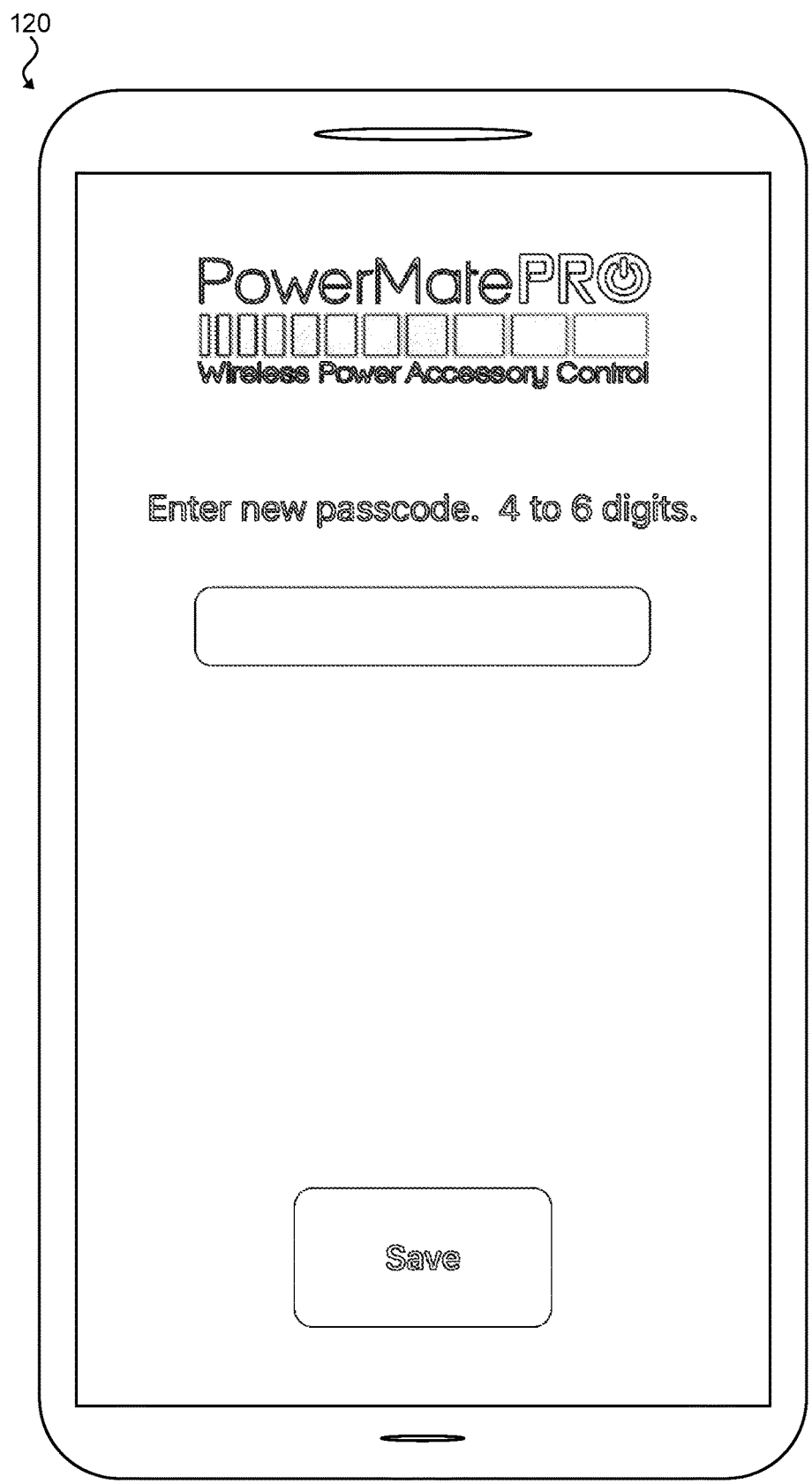
FIG. 17 is a screen view of an example embodiment of another user interface within the software application running on the wireless device included in the recreational vehicle auxiliary control system of FIGS. 8-16, in accordance with aspects of the present disclosure.

As shown in FIG. 7, the control module 110 may additionally include a user input panel, such as a membrane keyboard, arranged on the front of the mounting plate. The user input panel may be directly or indirectly connected to the printed circuit board. The user input panel advantageously allows a user to manually operate the switch of the control module 110. In some embodiments, the user input panel may include an "OPEN" or "EXTEND" button 112 as well as a "CLOSE" or "RETRACT" button 114.

The membrane keypad on the control module 110 may not only serve as the operational interface for manual operation, but may also be used for configuring certain aspects of the control system 100. Thus, the control module 110 may be designed to operate in various modes, including a normal operation mode and a configuration mode, for example. In some embodiments, the control module 110 may include LEDs or other visual indicators 118. The visual indicators 118 may indicate the operational mode of the control module 110 and/or the programmed settings, such as the open or close times, for example.

The polarity of the manual switch may be reversed through the keypad, thereby eliminating the need to switch the motor wires after an installation of the control system 100 is already completed. Additionally, a complete factory reset of the control system 100 may be executed through the keypad interface on the control module 110. Additionally or alternatively, the control module 110 may be remotely configured using the wireless device 120.

After installation of the control module 110 into the electrical connections of the auxiliary power systems, the user may test the configuration of the control module 110 by actuating both the "OPEN" or "EXTEND" button 112 as well as the "CLOSE" or "RETRACT" button 114 on the user input panel. If the auxiliary power system connected to the control module 110 retracts when the "OPEN" or "EXTEND" button 112 is actuated or extends when the "CLOSE" or "RETRACT" button 114 is actuated, the user may use the user input panel to change the polarity of the manual switch on the control module 110. For example, to enter into the configuration mode, the user may simultaneously actuate both the "OPEN" or "EXTEND" button 112 and the "CLOSE" or "RETRACT" button 114 for a predetermined time, such as 2 seconds. The control module 110 may include an audio and/or visual indication to alert the user that the control module 110 has entered into configuration mode. Next, within a predetermined cutoff time (e.g., about 10 seconds), the user may press and hold the "CLOSE" or "RETRACT" button 114, for example, for a predetermined hold time (e.g., about 2 seconds) to activate reversal of the output relay direction. The control module 110 may include an audio and/or visual indication to alert the user that the output relay direction has been reversed (e.g., 4 beep sounds and/or light blinks, light color change). The user may then re-test the control module 110 to ensure that the auxiliary power system extends when the "OPEN" or "EXTEND" button 112 is actuated and retracts when the "CLOSE" or "RETRACT" button 114 is actuated.

In some embodiments, to execute a complete factory reset of the control module 110, the user may enter into configuration mode on the control module 110 and then press and hold the "OPEN" or "EXTEND" button 112 within the predetermined cutoff time for the predetermined hold time. The control module 110 may include an audio and/or visual indication to alert the user that the control module 110 has been reset to factory defaults.

The printed circuit board may include a Bluetooth radio microcontroller and/or other wireless communication module for allowing remote operation of the switch. Remote operation of the switch may be via a software application running on the wireless device 120, such as a computer and/or mobile electronic device.

The control module 110 may utilize Bluetooth and BLE (Bluetooth Low energy) or other industry standard or proprietary protocols for the purpose of wireless connection to a wireless device 120. Since a wireless device 120 may handle multiple (typically at least 10) simultaneous Bluetooth connections, the software application may be designed in such a way that switching between Bluetooth connections to control different control modules is seamless and nearly imperceptible by the user. Using individual Bluetooth connections removes the possibility of patent infringement and possibly opens the door for additional patent claims for this invention.

Each control module 110 may include its own Bluetooth radio, which may allow the control system 100 to be retrofitted to existing recreational vehicle's without requiring any rewiring.

Bluetooth pairing mode can be initiated through the keypad interface on the control module 110. Since control module devices in the control system 100 may have to be paired with any new software application installation on a wireless device 120, requiring physical access to the control module 110 in order to initiate pairing mode may act as an additional layer of security where hacking or other unauthorized operation or control is a concern.

FIGS. 3-7C address the electrical theory of operation for the control system 100.

Figure 3:
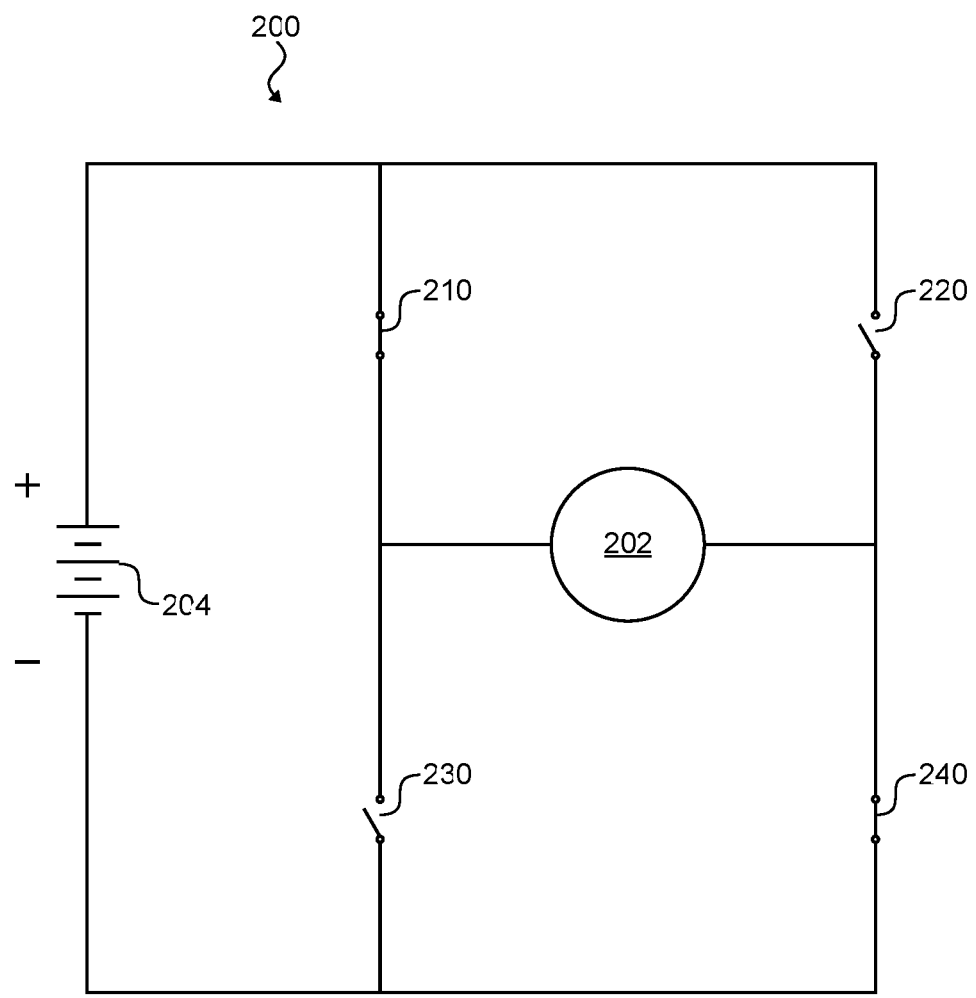
FIG. 3 is a diagram of the circuit within the control module and system of FIG. 2 with switches activated, in accordance with aspects of the present disclosure.

As shown in FIG. 3, the control module may be designed to operate two external power relays connected in an H-Bridge configuration. This configuration may control the operation and direction of a DC motor. The DC motor, in turn, may be used to position a designated mechanical load in a recreational vehicle, such as a slide-out room, awning, power jacks, or other DC motorized auxiliary power systems.

The control module may incorporate a microprocessor and Bluetooth radio system, along with additional electronics to allow the control module to remotely control the mechanical load via the attached drive motor using a wireless device.

In some embodiments, the auxiliary power system to be controlled includes a 12 V DC motor to position the mechanical load via a motion transmission system, such as a rack and pinion, for example. Other configurations of the motion transmission system are possible. The DC motor controls the mechanical load and its position, whether fully-retracted, fully-extended, or in transition between those two positions. The extending or retracting operation of the mechanical load may be determined by the rotational direction of the DC motor. The rotational direction of the DC motor may be controlled by the DC polarity being applied to the DC motor.

In some embodiments, the DC motor may be a permanent magnet DC motor with a first connection lead and a second connection lead. When the first connection lead has a positive voltage applied to it with respect to the second connection lead, the DC motor may rotate in a clockwise direction. When the second connection lead has a positive voltage applied to it with respect to the first connection lead, the DC motor may rotate counter-clockwise. This change in rotational direction of the DC motor, through the motion transmission system, may result in the mechanical load of the auxiliary power system either extending or retracting.

In some embodiments, an H-Bridge connection configuration may control the activation and rotational direction of the DC motor in an economical way. Economical methods of controlling the DC motor using the H-Bridge connection may be accomplished using a double pole, double throw, center off rocker switch or two single pole, double throw relays, for example.

Figure 2:
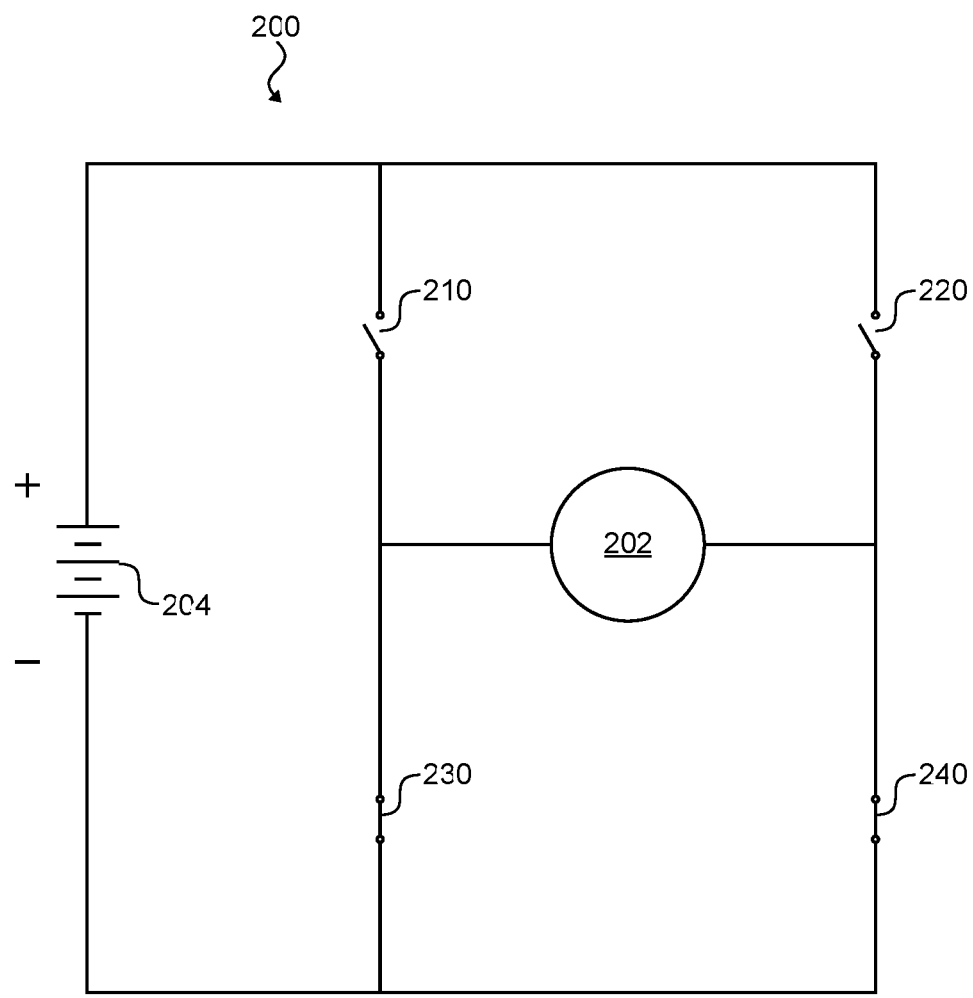
FIG. 2 is a diagram of an example embodiment of a circuit within a control module and system, in accordance with aspects of the present disclosure.

FIG. 2 shows an H-Bridge connection configuration 200 that includes a DC motor 202 with two single pole, double throw relays and a battery 204. The DC motor 202 is connected between four switches in the shape of an "H". The top two legs of the H-Bridge connection configuration 200 are connected to the positive terminal or cathode of the battery 204. The bottom two legs of the H-Bridge connection configuration 200 are connected to the negative terminal or anode of the battery 204. The left top switch 210 and the left bottom switch 230 are the contacts in the first relay. The right top switch 220 and the right bottom switch 240 are the contacts in the second relay. The left top switch 210 and the left bottom switch 230 may operate in a double throw fashion, wherein the state (ON or OFF) of the left top switch 210 is the opposite of the state of the left bottom switch 230. Similarly, the right top switch 220 and the right bottom switch 240 may operate in a double throw fashion, wherein the state of the right top switch 220 is the opposite of the state of the right bottom switch 240. Each group of contacts—both the left top switch 210 and the left bottom switch 230, as well as the right top switch 220 and the right bottom switch 240—may operate independently via their own magnetic coil that energizes each of the first and second relay. The left bottom switch 230 and the right bottom switch 240 may be a normally closed set of contacts of each of the first and second relay.

FIG. 2 shows the first and second relays in an un-energized state, such that the DC motor 202 is in an un-activated state. When both the first and second relays are un-energized, the connection leads of the DC motor 202 are both at a negative potential since the group of contacts including the left bottom switch 230 and the right bottom switch 240 are closed or ON. In this un-energized state, the DC motor 202 is off since there is no difference in voltage potential between the two connection leads of the DC motor 202.

FIG. 3 shows the first relay in an energized state and the second relay in an un-energized state, such that the DC motor 202 is in a clockwise activated state. When the first relay is energized, the left top switch 210 is closed and the left bottom switch 230 is open, and when the second relay is un-energized, the right top switch 220 is open and the right bottom switch 240 is closed. With the first relay energized and the second relay un-energized, current is allowed to flow through the left top switch 210 and the right bottom switch 240, such that there is a positive voltage potential on the left motor terminal and a negative voltage potential on the right motor terminal, resulting in a positive voltage applied across the DC motor 202. The positive voltage applied across the DC motor 202 may result in a clockwise rotational direction of the DC motor 202.

Figure 4:
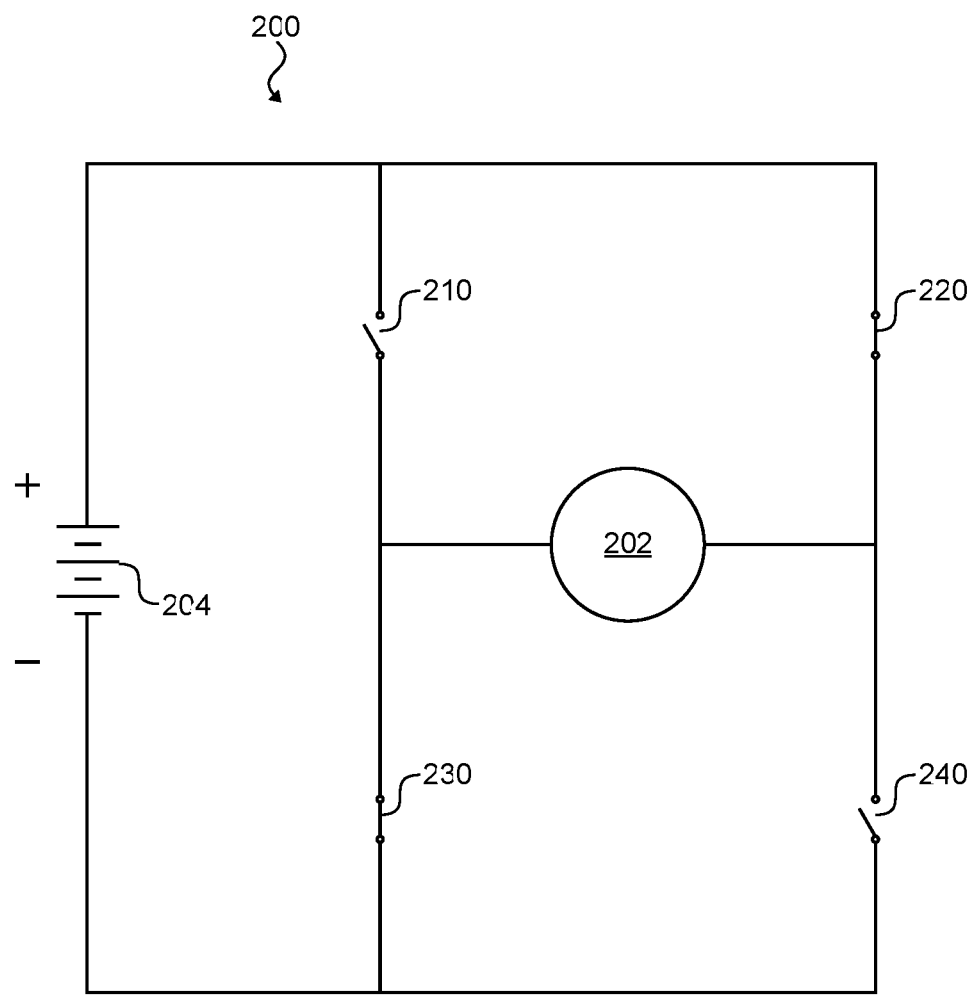
FIG. 4 is a diagram of the circuit within the control module and system of FIGS. 2-3 with alternate switches activated, in accordance with aspects of the present disclosure.

FIG. 4 shows the H-Bridge connection configuration 200 in a reverse operation from FIG. 3, where the first relay in an un-energized state and the second relay in an energized state, such that the DC motor 202 is in a counter-clockwise activated state. When the first relay is un-energized, the left top switch 210 is open and the left bottom switch 230 is closed, and when the second relay is energized, the right top switch 220 is closed and the right bottom switch 240 is open. With the first relay un-energized and the second relay energized, current is allowed to flow through the right top switch 220 and the left bottom switch 230, such that there is a negative voltage potential on the left motor terminal and a positive voltage potential on the right motor terminal, resulting in a negative voltage applied across the DC motor 202. The negative voltage applied across the DC motor 202 may result in a counter-clockwise rotational direction of the DC motor 202.

FIGS. 5A-C shows a diagram of an example implementation of a conventional two-relay system 300 for controlling the operation and rotational direction of a DC motor 302. The positive terminal of a DC power source 304 may be switched through a single pole, double throw center off rocker switch to either a forward relay coil 306 or a reverse relay coil 308. The opposite sides of the forward relay coil 306 and the reverse relay coil 308 are connected to a common negative terminal. An advantage of the conventional two-relay system 300 is that the controlling rocker switch can be a small, light duty type of switch that only needs to support the current requirements of the forward and reverse relay coils. For example, this may be only a few hundred milliamps or a few watts of power. Additionally, the forward and reverse relays may be installed closer to the controlled DC motor, thereby reducing any voltage drop across the wiring. The relays may have a high current rating, such as 40 amps, for example. The relays may be designed for automotive use. The relays may have relatively large coil power requirements in excess of about 1.25 watts. Thus, the relay coils may have a higher electrical current threshold to meet before the corresponding electrical contacts are energized or activated to change states.

As shown in FIGS. 5A-C, a rocker switch 310 may be at a center position, where neither the forward relay coil 306 nor the reverse relay coil 308 are energized. The rocker switch 310 may be positioned to energize the forward relay coil 306, leaving the reverse relay coil 308 in an un-energized state. The rocker switch 310 may be positioned to energize the reverse relay coil 308, leaving the forward relay coil 306 in an un-energized state. Energizing the forward relay coil 306 may cause a forward relay contact 316 to change from its normally un-activated state, and energizing the reverse relay coil 308 may cause a reverse relay contact 318 to change from its normally un-activated state.

FIG. 5A shows the conventional two-relay system 300 in an un-activated state with a rocker switch 310 at the center position, wherein both the forward relay coil 306 and the reverse relay coil 308 are in an un-energized state. The forward relay contact 316 and the reverse relay contact 318 are shown in a normally closed or un-energized state, wherein both terminals of the DC motor 302 are connected to the negative terminal of the DC power source 304. The DC motor 302 is in a non-operational state since there is no difference in voltage potential.

Figures 6A, 6B, 6C:
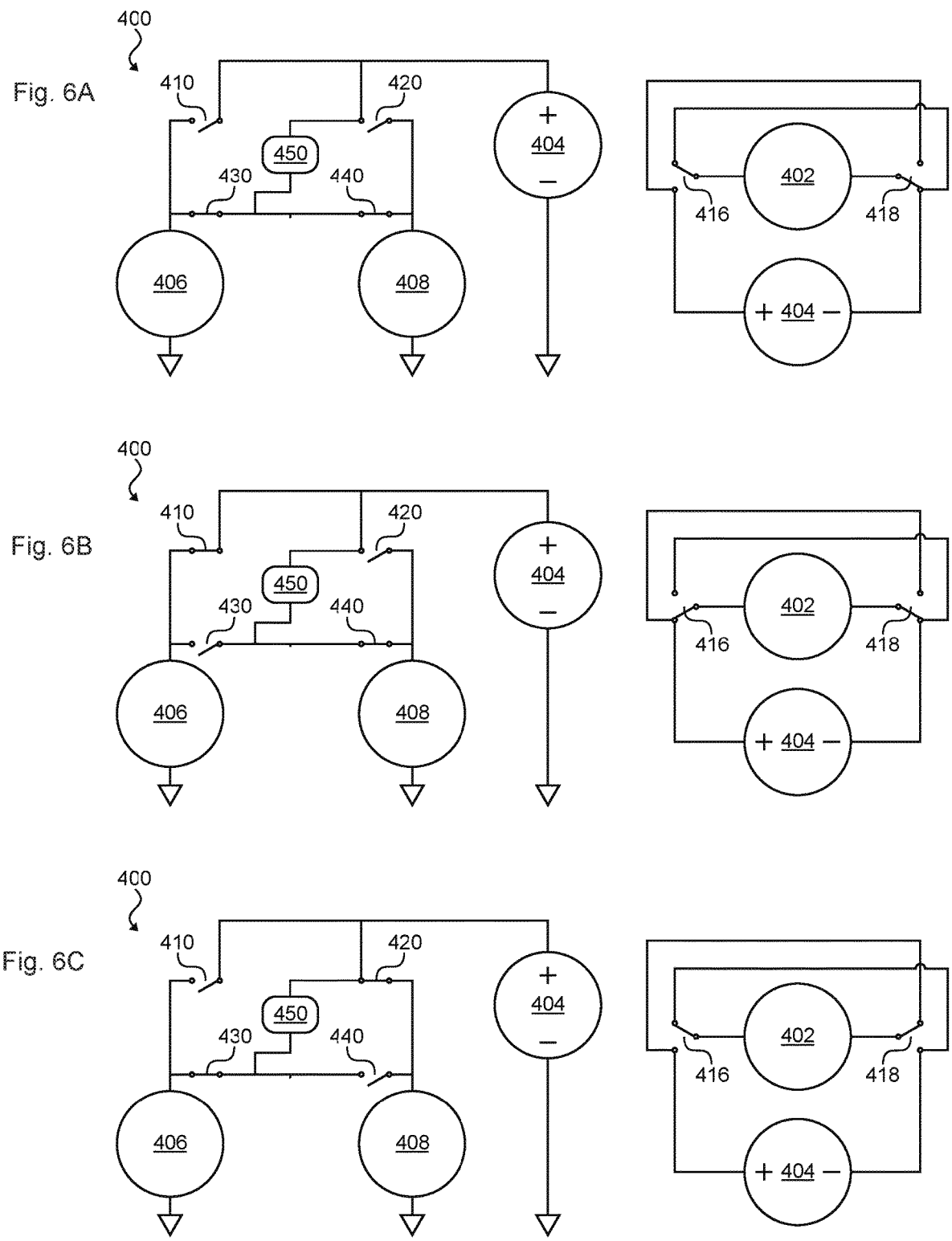
FIGS. 6A-C are diagrams of an example embodiment of a circuit system within a control module and system including relays and a circuit board within the control module, in accordance with aspects of the present disclosure.

FIG. 6B shows the conventional two-relay system 300 in an activated state with the rocker switch 310 actuated and energizing the forward relay coil 306, wherein the reverse relay coil 308 is in an un-energized state. In this activated state, the DC motor 302 may operate in a clockwise rotational direction. The forward relay contact 316 is shown in an energized state, and the reverse relay contact 318 is shown in an un-energized state. Thus, the left terminal of the DC motor 302 is connected to the positive terminal of the DC power source 304, and the right terminal of the DC motor 302 is connected to the negative terminal of the DC power source 304. The DC motor 302 is in an operational state since there is a positive voltage potential applied across the DC motor 302.

FIG. 6C shows the conventional two-relay system 300 in an activated state with the rocker switch 310 actuated and energizing the reverse relay coil 308, wherein the forward relay coil 306 is in an un-energized state. In this activated state, the DC motor 302 may operate in a counter-clockwise rotational direction. The reverse relay contact 318 is shown in an energized state, and the forward relay contact 316 is shown in an un-energized state. Thus, the left terminal of the DC motor 302 is connected to the negative terminal of the DC power source 304, and the right terminal of the DC motor 302 is connected to the positive terminal of the DC power source 304. The DC motor 302 is in an operational state since there is a negative voltage potential applied across the DC motor 302.

The control modules and systems may include a Bluetooth enabled power accessory control used to replace or supplement existing DC motor reversal control systems.

In some embodiments of the control system 100, the control module 110 may integrate a dual coil relay module directly on the printed circuit board for controlling the DC motor operation and rotational direction. The relay output of the control module 110 may be directly connected to the leads of the DC motor. The control module 110 may be configured without an intermediate relay module, such as those shown in FIGS. 6A-C. In these embodiments, the connection leads for both the DC motor and the power source may be directly connected to the control module 110. The connection leads for the power source may be +12 V DC and DC Negative. Thus, the control module 110 may replace the high current double pole, double throw (DPDT) center off rocker switch of the conventional two-relay system. The wiring configuration of the conventional two-relay system may be present in low- and medium-priced recreational vehicles due to its low cost. This wiring methodology may require high current wiring to be installed from the DC motor to the switch.

In some embodiments of the control system 100, the control module 110 may utilize a 3-wire connection to replace an existing low power handling single pole, double throw center off rocker switch for controlling the DC motor operation and rotational direction. This wiring configuration including a remote relay module may be preferred in medium- and higher-priced recreational vehicles over the double pole, double throw rocker switch implementation. This 3-wire configuration may allow for a smaller, low power rocker switch to be installed in a convenient location within the recreational vehicle. This rocker switch may be configured to only drive remote relay coils, which may require fewer and/or smaller gauge wires to be connected between the rocker switch and the remote relay module. The remote relay module may be mounted physically closer to the DC motor. The mounting location for the remote relay module may be hidden from and/or not easily accessible to the user.

The control module of the control system may be configured to replace a conventional polarity reversing rocker switch within the electrical connections of auxiliary power systems in a recreational vehicle. A conventional polarity reversing rocker switch may include 5 connection leads—2 for connecting to negative or ground, 1 for connecting to motor out, 1 for connecting to motor in, and 1 for connecting to a power source.

Referring to FIG. 6A, within the conventional two-relay system 300, three wires or connection leads may be available at the low power rocker switch, including a +12 V DC connection to the positive terminal of the DC power source 304 at the center position of the rocker switch 310, and the connection to each of the forward relay coil 306 and the reverse relay coil 308 at either of the two activated positions of the rocker switch 310. The opposing sides of each of the forward relay coil 306 and the reverse relay coil 308 may be connected to negative.

Where relay coils are wired to the connection leads of a rocker switch, there may be no direct connection to negative available when attempting to install the control module—or any other electronic device—at the rocker switch location. The direct connection to negative may be required to power the electronics of the control module for controlling the relay circuits. The relays within the remote relay module may have a high current capacity and a relatively high power coil requirement. This low coil sensitivity characteristic of the relays may be exploited in order to provide a "virtual" ground through the inactive relay coils and thus power the electronics of the control module.

As shown in FIGS. 6A-C, in some embodiments of the control system, a wiring configuration 400 may include a control module with electronics 450 wired to an external relay module. This 3-wire configuration 400 of the control module may include a first activating solid state relay 410 and a second activating solid state relay 420, which are both normally open, as well as a first grounding solid state relay 430 and a second grounding solid state relay 440, which are both normally closed. The first activating solid state relay 410 and the second activating solid state relay 420 may be used to activate either a forward relay coil 406 or a reverse relay coil 408. The first grounding solid state relay 430 and the second grounding solid state relay 440 may be used to switch the "virtual ground" in and out of circuit.

When the forward relay coil 406 is energized, the control module derives its connection to "virtual" negative through the reverse relay coil 408, which is in an un-energized state. When the reverse relay coil 408 is energized, the control module derives its connection to "virtual" negative through the forward relay coil 406, which is in an un-energized state. Under this connection method using the 3-wire configuration 400, the control module advantageously does not require installation and connection of an additional wire to DC negative to provide an actual direct negative power connection. Thus, aftermarket and/or retrofit installation of the control system in various recreational vehicles may be low-cost and simple, especially where installation of additional negative power connections are not viable.

Energizing the forward relay coil 406 may activate or change the state of a forward relay contact 416, and energizing the reverse relay coil 408 may activate or change the state of a reverse relay contact 418. The forward relay contact 416 and the reverse relay contact 418 may be normally closed, such that both the left and right sides of a DC motor 402 are connected to the negative terminal of a DC power source 404.

As shown in FIG. 6A, the 3-wire configuration 400 may be in an un-activated state. In this static, inactive state, the first grounding solid state relay 430 and the second grounding solid state relay 440 are closed, and thus, the "virtual ground" may be sourced through each of the two un-energized relay coils. The current consumption of the control module in this un-activated state may be less than about 1 thousandth of the electrical current threshold value necessary to energize or activate either of the relay coils. Because of this low current consumption, the voltage drop across the relay coils may be very low, such that the relay coils are at about the same voltage potential and appear as circuit negative. Where the forward relay contact 416 and the reverse relay contact 418 are both closed and un-activated, the DC motor 402 is in a non-operational state since there is no difference in the voltage potential across the DC motor 402.

As shown in FIG. 6B, the 3-wire configuration 400 may be in an activated state, with the forward relay coil 406 energized. To achieve this activated state, the control module 110 may open the first grounding solid state relay 430, thereby isolating the forward relay coil 406 from the "virtual ground". Then, the control module may close the first activating solid state relay 410, thereby applying a positive voltage to the forward relay coil 406. There may be a time delay between opening the first grounding solid state relay 430 and closing the first activating solid state relay 410. For example, the time delay may be about 10 milliseconds. With the forward relay coil 406 isolated from "virtual ground" and connected to both the positive terminal of the DC power source 404 and circuit negative, the forward relay coil 406 may be energized. Energizing the forward relay coil 406 may change the state of the forward relay contact 416, such that the forward relay contact 416 is activated and opened, thereby connecting the left side of the DC motor 402 to the positive terminal of the DC power source 404. When the left side of the DC motor 402 is connected to the positive terminal of the DC power source 404 and the right side of the DC motor 402 is connected to the negative terminal of the DC power source 404, there is a positive voltage potential applied across the DC motor 402. The positive voltage potential applied across the DC motor 402 thereby activates the DC motor 402, placing the DC motor 402 in an operational state. The clockwise rotational direction of the DC motor 402 in an operational state may drive the mechanical load forward.

As shown in FIG. 6C, the 3-wire configuration 400 may be in an activated state, with the reverse relay coil 408 energized. To achieve this activated state, the control module 110 may open the second grounding solid state relay 440, thereby isolating the reverse relay coil 408 from the "virtual ground". Then, the control module may close the second activating solid state relay 420, thereby applying a positive voltage to the reverse relay coil 408. There may be a time delay between opening the second grounding solid state relay 440 and closing the second activating solid state relay 420. For example, the time delay may be about 10 milliseconds. With the reverse relay coil 408 isolated from "virtual ground" and connected to both the positive terminal of the DC power source 404 and circuit negative, the reverse relay coil 408 may be energized. Energizing the reverse relay coil 408 may change the state of the reverse relay contact 418, such that the reverse relay contact 418 is activated and opened, thereby connecting the right side of the DC motor 402 to the positive terminal of the DC power source 404. When the left side of the DC motor 402 is connected to the negative terminal of the DC power source 404 and the right side of the DC motor 402 is connected to the positive terminal of the DC power source 404, there is a negative voltage potential applied across the DC motor 402. The negative voltage potential applied across the DC motor 402 thereby activates the DC motor 402, placing the DC motor 402 in an operational state. The counter-clockwise rotational direction of the DC motor 402 in an operational state may drive the mechanical load in reverse.

In some embodiments of the control system, the control module may utilize a 4-wire configuration to replace an existing low power rocker switch for controlling the DC motor operation and rotational direction similarly to the implementation of the control system in the 3-wire configuration 400. The 3-wire configuration 400 may work well where the equivalent resistance of the control module is much larger than the resistance of the relay coils. However, the control module of the 4-wire configuration may be a type of electronic modules that performs the same switching role as the external relay module, but interfaces to the controlling rocker switch in a different way.

The 4-wire configuration of the control module may include an embedded microcontroller that operates the relay coils directly. The rocker switch connection may be similar to the connection in the 3-wire configuration 400, however, instead of driving the relay coils directly, the rocker switch may be connected to and drive the input pins of the microcontroller. The input pins of the microcontroller may be high impedance, similar to the control module.

Where powering the control module using the virtual ground method of the 3-wire configuration 400 may not work because the very small current consumption of the control module alone is enough to cause either microprocessor input pin to activate, a real DC negative wire may be installed to connect to the control module directly to negative power.

In this 4-wire configuration, a first and second activating solid state relay may emulate the rocker switch operation without the need for a first and second grounding solid state relay. The 4-wire configuration may be easiest to install during manufacture of the recreational vehicle.

Some additional safety features may be added to the control modules and systems to control system overrun. These overrun controls may aid in eliminating, or at the very least limiting, the exposure to the system of gross overruns that could cause amperage requirements that exceed the fuse, breaker, or even the motor. Over limit amperage requirements may cause issues that range from inconvenience in the case of a blown fuse to permanent motor damage that would require a repair or replacement of the motor. These controls may be applicable to the automatic extension/retraction functions of the control system and may applied to these functions whether they are initiated from the software application running on a wireless device or via the physical control module keypad.

These safety features may be made possible by tracking the position of the auxiliary system being controlled based on the timing of movements. Each time an automatic extension/retraction function is run all the way through to the end of the programmed automatic extension/retraction time, the control modules and systems may set a position value that relates to fully open or fully closed depending on the automatic extension/retraction function that was used. Once this position value is established, any movement of the auxiliary system caused by using the manual open or close buttons in the software application or on the keypad will cause positioned values to be incremented or decremented based on movement of the auxiliary system. If the position value is at the maximum (fully open position value) additional manual open movement may not change the position value. However, if the position value is at the maximum any close movement time may be measured and the position value may be decremented an amount that relates to the measured time of the manual close movement. If the position value is at the minimum (fully closed position value) an additional manual close movement may not change the position value. However, if the position value is at the minimum, then any open movement time may be measured and the position value will be incremented an amount that relates to the measured time of the manual open movement. Position values may also be incremented or decremented based on movement using an automatic extension/retraction function that was aborted instead of being allowed to run to the end of the programmed time. In this scenario, the movement time from the function invocation to the abort and a determination may be made whether the position value needs to be changed or not (which it may not in the case of an aborted move that was in the close direction when the current position value indicated fully closed or in the case of an aborted move that was in the open direction when the current position value indicated fully open). If the position value does need to be changed then it may be incremented or decremented based on the same movement time based calculation used in the above described manual movement.

Each time an automatic extension/retraction function is invoked, determinations may be made on how to proceed based on the current position value. If the current position value indicates a fully open position then an automatic Open function may be disallowed and the function will terminate. If the current position value indicates a fully closed position then an automatic Close function may be disallowed and the function will terminate. If the current position value indicates any other position besides fully open or fully closed, the position value may be used to calculate the actual time necessary to complete an automatic Open or automatic Close function while eliminating or minimizing system overrun. This may be accomplished by converting the current position value to a time value based on the corresponding programmed time for automatic Open or automatic Close, whichever the user has invoked. Once the time value has been calculated relative to the programmed automatic time, the automatic time may be decremented by the calculated time value to result in the actual time needed to complete the operation from the current position.

Additionally, indications and notifications in the software application may be made based on the invoked automatic extension/retraction function and the current position value. The software application may display a countdown (in seconds) of the time remaining until a currently running automatic extension/retraction function completes. The start number for this countdown may be the programmed automatic time when starting the function from a fully open or fully closed position, but the starting number may be altered after calculations are made for a partial Auto move and the correct value for the completion countdown may be displayed. Other notifications and warnings as well as restrictions may also be displayed or imposed based on the current position value and the function being invoked.

The control system 100 may include the safety feature whereby the firmware stops all operations that were initiated by the software application if the Bluetooth connection is ever lost.

The control module 110 may include firmware installed on the device. The firmware may lock out the use of the membrane keypad when a Bluetooth connection is active. This safety feature may eliminate the possibility that the keypad could be used to request a retraction motion of a motor at the same time as the software application is being used to request an extension motion of the motor. This method of preventing operational conflict may be much easier and safer to manage than attempting to manage commands from both the software application and the keypad on the control module 110 simultaneously, although both are possible.

FIGS. 7-17 show various example screenshots of the software application which may run on the wireless device within the control system. The software application may be designed to enable maximum performance and flexibility with various wireless devices. For example, some wireless devices may include hardware that allows for multiple, simultaneous Bluetooth connections. This hardware feature may be utilized in control system installations with multiple control modules for controlling multiple auxiliary power systems.

The software application may include settings that allow for operation of the control system in two different connection modes. In an on-demand connection mode, the software application may cause the wireless device to connect to one, selected control module at a time. In the on-demand connection mode, the control module for connection may be selected from a list of previously paired and/or saved control modules. In a multi-module connection mode, the software application may cause the wireless device to connect to all available control modules from the list of previously paired and/or saved control modules. The software application may be configured to operate in the on-demand connection mode by default. The software application may include a settings menu wherein the default connection mode may be changed and saved for future use sessions.

The software application may include a button and/or link within the application that enables immediate access to the system and/or wireless connection settings of the wireless device.

Because the control module units may use individual Bluetooth connections, the software application may be designed to simplify management of these connections. The software application may also be designed in a way that allows adaptation of managed single Bluetooth connections or multiple simultaneous Bluetooth connections to accommodate both low performance and high performance wireless devices.

As each control module 110 is paired with the software application running on the wireless device 120, the user may be prompted to give the new control module 110 a unique name. During operational use of the software application, the user may select the control module 110 desired to be controlled from a list of previously assigned, user-defined control module names.

The software application of the control system 100 may be configured to connect to all paired control modules when the software application is launched. Additionally or alternatively, the software application of the control system 100 may be configured to connect to each paired control module 110 as it is selected for control. This may allow the software application of the control system 100 to be configured in a way that will maximize the performance of the control system 100 on any type of wireless device 120 without regard to processor speed, available memory, or other resources provided by the wireless device 120.

The 12 V DC recreational vehicle auxiliary power systems that may be controlled using the control system 100 may be systems that have both a fully-extended and fully-retracted position. Traditionally, extension and retraction of these auxiliary power systems is achieved using a manual method. This manual method may consist of the user pushing the button in the "Open" or "Close" direction until the auxiliary power system was fully extended or retracted.

In conventional systems, buttons that enable a full extension or retraction of consumer products or equipment with a single actuation generally require some type of limit switches at both the fully-extended and fully-retracted positions so that the system may be aware of reaching the desired positions. However in the recreational vehicle industry, the combination of an additional cost of these limit switches, the associated wiring, and a necessary more complex switch with added buttons has kept this single actuation type of system from being implemented in all but the most expensive recreational vehicles.

The control system 100 may include a unique way to handle the full extension/retraction functionality with a single button actuation without requiring the installation and implementation of limit switches and their associated wiring. Instead of the traditional feedback loops provided by limit switches, the single actuation feature of the control system 100 may use time as the limiting factor when achieving full extension/retraction. The software application of the control system 100 may include a time configurator for both a fully extend function and a fully retract function. This may allow a unique time value to be automatically recorded when the user continually actuates a button within the software application to fully extend or fully retract the auxiliary power system being controlled. Once the time value for each of the extension and retraction directions has been recorded, the software application of the control system 100 may allow editing the time values by manually entering the number of seconds of operation. This manual time editing feature may be useful if the time configurator within the software application records 9 seconds for a particular function, and the user desires the time value to be 10 seconds for complete extension or retraction of the auxiliary power system to meet their satisfaction. In this case, the user may manually make the change to the time value instead of using the time configurator again to record the time value.

The software application of the control system 100 may allow the user to define whether a particular control module 110 may utilize the single actuation feature. Some controlled auxiliary power systems, such as stabilizing jacks, for example, may need to be extended and retracted for different time values at each camping site and, as such, may not be desirable candidates for use with the single actuation feature. Access to the single actuation feature and settings may be configured in the software application of the control system 100 by selecting/deselection a checkbox within the display of the software application running on the wireless device 120. Selection of the checkbox may trigger displaying the single actuation feature settings and allow access to the time configurators.

The single actuation feature of the control system 100 may use either a measured time or a user inputted time to limit the duration of a single actuation initiated extension or retraction signal. In an alternative embodiment, the control module 110 requires a sequence of initiating actions to operate the control systems, such as the power awning 104 and the power slide-out 106. By way of example, a key on the membrane keyboard of the control module 110 would need to be pressed in rapid succession or at least in succession during a preset time period to initiate the operation of the control system. This can be accomplished by pressing in succession the "OPEN" or "EXTEND" button 112 within a preset time period. Alternatively, the same can be accomplished by the pressing in succession the "CLOSE" or "RETRACT" button 114 within a preset time period. The preset time period is preferably 20 seconds or less.

The software application of the control system 100 may provide a time configurator that allows the time value required for a full extension or full retraction of the auxiliary power system to be recorded as the auxiliary power system is being operated by actuation of a button within the software application running on a wireless device 120. The time configurator function may eliminate the need for the user to iteratively determine the amount of time required to extend or retract a given auxiliary power system every time extension and/or retraction is desired.

The software application of the control system 100 may include an ability to measure and record separate amounts of time or time values for extending and/or retracting an auxiliary power system. The control system 100 may include separate time values for each extension and retraction since extension is likely to take a slightly different amount of time to complete than retraction, due to backlash in the drive system of the auxiliary power system.

The software application of the control system 100 may allow the user to modify or replace previously recorded time values via a keyboard input on the wireless device 120.

The software application of the control system 100 may display a "Abort" button while executing a single actuation operation, so that the operation may be stopped immediately if needed.

The GPS or other location service on the wireless device 120 may be utilized to prevent operation of the control system 100 to prevent potential damage to the power awning 104 and/or recreational vehicle 102.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the presently discloses embodiments and are contemplated thereby.

What is claimed is:

1. A method for automatically controlling recreational vehicle power systems, the method comprising:
    activating a first switch via a control module to extend the recreational vehicle power system;
    measuring a first time period for fully extending the recreational vehicle power system via the control module while the first switch is activated;

storing the first time period in memory within the control module;

sending an automatic extension signal to the control module, causing the control module to access the first time period in memory and activate the first switch for the duration of the first time period; and performing a succession of actions within a preset time period on the control module to allow extending the recreation vehicle power system or retracting the recreational vehicle power system.

2. The method of claim 1, further comprising:

activating a second switch via the control module to retract the recreational vehicle power system;

measuring a second time period for fully retracting the recreational vehicle power system via the control module while the second switch is activated;

storing the second time period in memory within the control module; and sending an automatic retraction signal to the control module, causing the control module to access the second time period in memory and activate the second switch for the duration of the second time period.

3. The method of claim 1, wherein the control module further includes a wireless module, and wherein the first switch is activated via a first signal sent from a wireless device connected to the wireless module within the control module.

4. The method of claim 1, further comprising calculating a position value of the recreational vehicle power system each time it is activated.

5. A method of operating power systems of a recreational vehicle, the method comprising:

receiving a first signal via a control module connected to the power system of the recreational vehicle until the power system is fully extended;

energizing a first relay coil connected to a motor of the power system via the control module, causing the motor to operate in a first rotational direction until the power system is fully extended;

measuring an automatic extend time via the control module based on the length of the first signal;

storing the automatic extend time in memory;

receiving a second signal via the control module connected to the power system of the recreational vehicle until the power system is fully retracted;

energizing a second relay coil connected to the motor of the power system via the control module, causing the motor to operate in a second rotational direction until the power system is fully retracted;

measuring an automatic retract time via the control module based on the length of the second signal;

storing the automatic retract time in memory;

receiving an automatic retract signal via the control module; and energizing the second relay coil connected to the motor of the power system via the control module in response to the automatic retract signal for the stored automatic retract time, causing the motor to operate in the second rotational direction;

measuring an actual retract time via the control module while the control module is energizing the first relay coil;

receiving an abort signal via the control module;

de-energizing the second relay coil via the control module in response to the abort signal, causing the motor to stop operating; and storing the actual retract time in memory.

6. The method of claim 5, further comprising:

receiving an automatic extend signal via the control module; and energizing the first relay coil connected to the motor of the power system via the control module in response to the automatic extend signal for the stored automatic extend time, causing the motor to operate in the first rotational direction.

7. The method of claim 6, further comprising:

measuring an actual extend time via the control module while the control module is energizing the first relay coil;

receiving an abort signal via the control module;

de-energizing the first relay coil via the control module in response to the abort signal, causing the motor to stop operating; and storing the actual extend time in memory.

8. The method of claim 7, further comprising:

receiving the automatic extend signal via the control module;

generating a remaining extend time based on the automatic extend time and the actual extend time stored in memory; and energizing the first relay coil connected to the motor of the power system via the control module in response to the automatic extend signal for the generated remaining extend time.

9. The method of claim 7, further comprising:

receiving an automatic retract signal via the control module;

generating a remaining retract time based on the automatic retract time and the actual extend time stored in memory; and energizing the second relay coil connected to the motor of the power system via the control module in response to the automatic retract signal for the generated remaining retract time, causing the motor to operate in the second rotational direction.

10. The method 5, further comprising:

receiving the automatic retract signal via the control module;

generating a remaining retract time based on the automatic retract time and the actual retract time stored in memory; and energizing the second relay coil connected to the motor of the power system via the control module in response to the automatic retract signal for the generated remaining retract time.

11. The method of claim 5, further comprising:

receiving an automatic extend signal via the control module;

generating a remaining extend time based on the automatic extend time and the actual retract time stored in memory; and energizing the first relay coil connected to the motor of the power system via the control module in response to the automatic extend signal for the generated remaining extend time, causing the motor to operate in the first rotational direction.

\* \* \* \* \*